UNITED STATES PATENT OFFICE 2,258,672

PROCESS FOR REFINING FATTY SUBSTANCES

Loran O. Buxton and Howard B. Colman, Belleville, N. J., assignors to National Oil Products Company, Harrison, N. J., a corporation of New Jersey No Drawing. Application February 6, 1940,
Serial No. 317,524

17 Claims. (Cl. 260—420)

This invention relates to the refining of fatty substances having objectionable tastes and odors, more particularly to the refining of fat-soluble vitamin-containing materials having objectionable tastes and odors.

As is well known, there are many fatty substances employed for human consumption which possess or tend to develop undesirable tastes and odors. Thus, for example, substances such as lard, if permitted to stand under atmospheric conditions for a prolonged period of time, develop rancid tastes and odors which are particularly undesirable. The problem of producing products having pleasant tastes and odors is particularly acute in connection with fish liver oils. These oils are known to be an excellent source of both vitamins A and D; moreover, saponification of fish liver oils and extraction of the unsaponifiable material therefrom yields fat-soluble vitamin-containing concentrates which have found a wide variety of uses. However, while such vitamin-containing materials are eminently satisfactory for many purposes, they generally possess the undesirable taste and odor normally associated with products of fish origin. Fat-soluble vitamin-containing materials derived from sources other than of a fish origin may also possess objectionable tastes and odors. Many attempts have been made in an endeavor to improve the taste and odor of fat-soluble vitamin-containing materials objectionable in these respects. For example, an alkali refining method has been employed for improving the tastes and odors of fish liver oils; in this method an alkali soap is prepared in the presence of the oil and then removed, the soap tending to carry with it some of the objectionable taste and odor. However, this method possesses many disadvantages, among them being that the oil becomes less stable when treated in this manner; furthermore, the odor and taste of the oil are not improved as much as might be desired. Another method commonly employed for improving the taste and odor of vitamin oils and concentrates involves passing steam through the heated oil or concentrate at a reduced pressure; while this method effects some deodorization, the deodorization is in most cases merely temporary, and, furthermore, this process removes only objectionable constituents of a volatile nature.

It has been proposed to deodorize menhaden oil by gently heating the oil with formaldehyde in the presence of concentrated hydrochloric acid. According to the proponent of this method, after the formaldehyde treatment has been completed, super-heated steam is first led through the oil and then atomized lime water and steam are passed therethrough in order to obtain a suitable product. This method of operation is very disadvantageous because of the number of treatments necessary in order to obtain an acceptable product; furthermore, the presence of concentrated hydrochloric acid in the heated oil would cause considerable hydrolysis of the glycerides. Hence it is not surprising that this method of deodorizing menhaden oil has not received wide commercial use. The proposed method would be inapplicable to the refining of vitamin-containing oils, since the vitamins contained in the oils would be substantially completely destroyed thereby.

It is an object of this invention to provide a process for removing undesirable tastes and odors from fatty substances objectionable in these respects.

We have found that the undesirable tastes and odors of fatty substances objectionable in these respects may be substantially completely removed by subjecting such fatty substances in liquid condition to the action of the vapors of an aliphatic aldehyde having a boiling point below about 200° C., providing these substances are substantially free of mineral acids. The term "fatty substance" is used herein to include oils and fats containing fatty acids, fatty alcohols or derivatives thereof; thus the term includes among other substances any fat-soluble vitamin-containing oil or concentrate, as well as vegetable, animal and marine oils and fats substantially free of vitamins. The process of our invention is preferably carried out by passing vapors of formaldehyde or acetaldehyde through the substance to be refined at a temperature between about 100° C. and about 175° C. Our invention is particularly adapted for removing undesirable tastes and odors from fat-soluble vitamin-containing materials objectionable in these respects. Our process may be carried out by passing the aldehyde vapors through the fatty substance in liquid condition in an open vessel; however, we prefer to carry out this process in an inert gas atmosphere and under reduced pressure, particularly when treating vitamin-containing materials. Our refining process may be combined with other processes for refining fatty substances having objectionable tastes and odors; thus, for example, when treating fat-soluble vitamin-containing materials it may be desirable to remove any free fatty acids present in these materials by treatment with alkali, or to decolorize the materials by contact with decolorizing carbon. It will be found that in every case fatty substances treated in accordance with our invention possess tastes and odors far improved over those of the original substances; these refined products are thus suitable for practically all purposes, particularly for human consumption. Moreover, the process of our invention stabilizes the fatty substances since it has been found that the peroxide numbers of fatty substances refined in accordance with our invention are much lower than those of the unrefined substances.

Any fatty substance having an objectionable taste and odor may be treated in accordance with our invention. Our invention is particularly applicable to the refining of fat-soluble vitamin-containing materials having undesirable tastes and odors; thus materials containing vitamins A, D, E or K, such as, for example, cod liver oil, halibut liver oil, sword fish liver oil, tuna liver oil, shark liver oil, whale liver oil, porpoise liver oil, seal liver oil, wheat germ oil and similar oils, as well as concentrates obtained from such oils, may be treated. The vitamin-containing material to be treated in accordance with our invention should not contain any foreign metals, since the presence of such metals usually accelerates deterioration of the vitamin content of the material at the elevated temperatures preferably employed. However, fatty substances containing substantially no vitamins which possess objectionable tastes and odors may also be treated; for example, substances such as lard or vegetable oils which have become rancid due to prolonged standing under atmospheric conditions may be advantageously refined by the process of our invention in order to remove their rancid tastes and odors.

The aldehyde vapors employed in the refining process of our invention may be vapors of any aliphatic aldehyde having a boiling point below about 200° C., such as, for example, formaldehyde, acetaldehyde, propionaldehyde, butyraldehyde, heptaldehyde, furfural, etc. It is to be understood that the term "aliphatic" is used throughout the specification and claims in a broad sense so as to include not only straight chain aliphatic aldehydes such as acetaldehyde, but also cycloaliphatic aldehydes such as furfural. We prefer to employ vapors of either formaldehyde or acetaldehyde in the practice of our invention because of the excellent results obtained with these vapors and because of the ready availability and comparative low cost of the aldehydes.

In carrying out the process of our invention as applied to the refining of fat-soluble vitamin-containing oils having objectionable tastes and odors, vapors of an aliphatic aldehyde boiling below about 200° C. are generated and the oil to be refined is then subjected to the action of these vapors. The vapors may be generated in any of the many ways known to the art. We prefer to employ vapors of either formaldehyde or acetaldehyde in the practice of our invention; these vapors are preferably generated either by heating an aqueous solution of these aldehydes until the desired vapors are obtained or by heating polymers of these aldehydes, e. g. paraformaldehyde or paraldehyde, respectively, until the monomers are vaporized. If the vapors are generated from materials containing water, they may contain varying amounts of water vapor, which may combine with the aldehyde vapors to form hydrates; it is to be understood that our invention is intended to cover the employment of such hydrated vapors. The aldehyde vapors are preferably generated in a vessel separate from that in which the oil is to be refined and then passed into the vessel containing the oil. However, the aldehyde vapors may be generated in the vessel containing the oil; for example, paraformaldehyde may be mixed with an unrefined oil and the mixture then heated to a temperature sufficient to liberate formaldehyde vapors.

The vitamin-containing oil having an objectionable taste and odor may be treated in accordance with our invention at any temperature below about 200° C., provided the temperature is sufficiently high to permit the vapors to pass through the oil. However, we have found that it is preferable to heat the oil to a temperature between about 100° and about 175° C. and then pass the aldehyde vapors through the heated oil with agitation. It is essential for the success of our invention that the oil contain no mineral acid. The oil may be heated and the vapors passed therethrough in an open vessel if desired, but in order to avoid substantial destruction of the vitamin A content of the oil and to assist in the removal of odoriferous constituents, the heating and refining steps are preferably carried out in an inert gas atmosphere and under reduced pressure, e. g. pressures below 20 mm. Antioxidants such as lecithin or hydroquinone may be added to the oil. The oil should be subjected to the action of the aldehyde vapors until substantially all the undesirable taste and odor of the oil are removed; the time required for attaining this result may vary from about 5 minutes to about 1 hour, but generally between about 10 minutes and about 20 minutes are sufficient. At the end of this treatment excess aldehyde vapors may be removed from the refined oil by vacuum evaporation or by bubbling an inert gas therethrough.

When the refining treatment of our invention is substantially complete, the vitamin-containing oil may be permitted to cool, if elevated temperatures are employed, and the refined oil separated from any residual material contained therein. The resulting products possess very little, if any, of the objectionable taste and odor characteristic of the materials from which they are obtained; hence these products are eminently suitable for a variety of purposes and find particular application in the preparation of vitamin products for human consumption. These oils are more stable than the original oils as is evidenced by the fact that their peroxide numbers are much lower than those of the original unrefined oils.

While the above detailed description has dealt with the refining of a fat-soluble vitamin-containing oil in accordance with our invention, it is to be understood that our invention is not limited to the refining of such oils but may be employed to remove objectionable tastes and odors from any fatty substance objectionable in these respects.

The refining process of our invention may be combined with other refining processes in order to produce fatty substances having improved characteristics. Thus when refining a fat-soluble vitamin-containing oil, it may be desirable to decolorize the oil prior to the aldehyde treatment of our invention by contacting it with decolorizing carbon. The carbon refining is preferably carried out by mixing the vitamin oil with a completely deaerated mixture of decolorizing carbon and a solvent for the oil and then separating the refined vitamin solution from the carbon; this method of refining is disclosed and claimed in co-pending application Serial No. 227,599, filed August 30, 1938. We have found that oils which are first carbon refined and then treated with aldehyde vapors in accordance with our invention possess properties which make them highly suitable in the manufacture of refined fat-soluble vitamin-containing materials. In many cases it may be found desirable to remove free fatty acids from the fat-soluble vitamin-containing oil to be refined by contacting the oil with alkali under conditions such that the free fatty acids form soaps and are thus removed.

We have not been able to definitely ascertain the manner in which the aldehyde gases accomplish the refining of the fatty substances treated in accordance with our invention. We believe one of the most important factors contributing to the success of our invention is our discovery that mineral acids should not be present in the substance being refined, since mineral acids tend to cause polymerization of the aldehydes, thus destroying the effective refining action of the aldehyde gases. It is generally believed that the objectionable odors and tastes of fatty substances are due to the presence therein of nitrogenous compounds and highly unsaturated fatty acids. It is our belief that the aldehydes condense with the nitrogenous compounds and cause their removal; as yet, however, we have found no satisfactory explanation for the fact that the process of our invention also effects the removal of the odors and tastes attributable to the highly unsaturated fatty acids. Hence we do not wish to be confined to any particular theory with regard to the manner in which our invention operates.

The following examples are illustrative of our invention; amounts are given in parts by weight.

Example I 20 parts of a shark liver oil containing 113,000 A units per gram and having a very fishy taste and odor were heated to 150° C. in a nitrogen atmosphere and under 10 mm. pressure. Formaldehyde vapors were generated by heating a 27% aqueous solution thereof in a vessel connected with the vessel containing the heated oil and these vapors were permitted to pass through the heated oil for about 30 minutes, the oil being thoroughly agitated. At the end of this time the flow of formaldehyde vapors through the oil was discontinued and nitrogen was bubbled through the heated oil for 10 minutes. The resulting product was substantially odorless and tasteless and possessed practically the same vitamin A potency as the original oil. The peroxide number of the refined oil was 2.8, whereas the peroxide value of the original oil was 10.5.

Example II 20 parts of a shark liver oil containing 113,000 A units per gram and having a very fishy taste and odor were heated to 150° C. in a nitrogen atmosphere and under 10 mm. pressure. Formaldehyde vapors were generated by heating paraformaldehyde in a vessel connected with the vessel containing the heated oil and these vapors were permitted to pass through the heated oil for about 30 minutes, the oil being thoroughly agitated. At the end of this time the flow of formaldehyde vapors through the oil was discontinued and nitrogen was bubbled through the heated oil for 10 minutes. The resulting product was substantially odorless and tasteless and possessed practically the same vitamin A potency as the original oil. The peroxide number of the refined oil was 2.2, whereas the peroxide value of the original oil was 10.5.

Example III 100 parts of cod liver oil fortified by the addition of vitamin A thereto so as to contain 2940 A units per gram and having a very fishy taste and odor were heated to a temperature of about 170° C. in a nitrogen atmosphere and under 10 mm. pressure. Formaldehyde vapors were generated by heating a 40% aqueous solution of formaldehyde in a vessel connected to the vessel containing the oil and these vapors were permitted to pass through the heated oil for about 30 minutes, the oil being thoroughly agitated. At the end of this time the flow of formaldehyde vapors was discontinued and nitrogen gas was passed through the heated oil for 10 minutes. The resulting product was substantially odorless and tasteless and possessed practically the same vitamin A potency as the original oil.

Example IV 100 parts of halibut liver oil containing 58,000 A units per gram and having a very fishy taste and odor were heated to a temperature of about 170° C. in a nitrogen atmosphere and under 10 mm. pressure. Formaldehyde vapors were then generated by heating a 40% aqueous solution of formaldehyde in a vessel connected with the vessel containing the oil, and these vapors were permitted to pass through the heated oil for about 30 minutes, the oil being thoroughly agitated. At the end of this time the flow of formaldehyde was discontinued and nitrogen gas was passed through the oil for 10 minutes. The resulting product was substantially odorless and tasteless and possessed practically the same vitamin A potentcy as the original oil.

Example V 100 parts of halibut liver oil containing 50,000 A units per gram and having a very fishy taste and odor were mixed with 1 part of lecithin and the mixture heated to a temperature of about 160° C. in a nitrogen atmosphere and under 10 mm. pressure. Formaldehyde vapors were then generated by heating a 40% aqueous solution of formaldehyde in a vessel connected with the vessel containing the oil, and these vapors were permitted to pass through the heated oil for about 30 minutes, the oil being thoroughly agitated. At the end of this time the flow of formaldehyde was discontinued and nitrogen gas was passed through the oil for 10 minutes. The resulting product was substantially odorless and tasteless and possessed practically the same vitamin A potency as the original oil.

Example VI 100 parts of halibut liver oil containing 58,000 A units per gram and having a very fishy taste and odor were heated to a temperature of about 170° C. in a nitrogen atmosphere and under 10 mm. pressure. Acetaldehyde vapors were then generated by heating a 30% aqueous solution of acetaldehyde in a vessel connected with the vessel containing the oil, and these vapors were permitted to pass through the heated oil for about 30 minutes, the oil being thoroughly agitated. At the end of this time the flow of acetaldehyde vapors was discontinued and nitrogen gas was passed through the heated oil for 10 minutes. The resulting product was substantially odorless and tasteless and possessed practically the same vitamin A potency as the original oil.

Example VII 10 parts of a decolorizing carbon known as "Nuchar XXX" were suspended in 900 parts of ethylene dichloride and the suspension agitated for 10 minutes until thoroughly deaerated. 100 parts of a shark liver oil containing 109,500 A units per gram, and having a very fishy taste and odor and a dark color, were then introduced into the suspension and the mixture agitated for 30 minutes. The carbon was then removed by filtration and washed with ethylene dichloride in a nitrogen atmosphere to remove the adsorbed vitamin-containing material. The ethylene dichloride used to wash the carbon was combined with the solution of the shark liver oil in ethylene dichloride and the ethylene dichloride was then evaporated from this mixture under a vacuum and in a nitrogen atmosphere. The decolorized oil was heated to a temperature of about 150° C. in a nitrogen atmosphere and under 10 mm. pressure. Formaldehyde vapors were generated by heating a 40% aqueous solution of formaldehyde in a vessel connected with the vessel containing the oil, and these vapors were permitted to pass through the heated shark liver oil for 30 minutes, the oil being thoroughly agitated. At the end of this time the flow of formaldehyde vapors was discontinued and nitrogen gas was passed through the heated oil for 10 minutes. The resulting product was substantially odorless and tasteless, possessed a light-yellow color and had practically the same vitamin A potency as the original oil.

Example VIII 1 part of paraformaldehyde was added to 100 parts of sperm oil having a very fishy taste and odor. The mixture was then heated at 150° C. for about 1 hour in an open vessel. The resulting product was substantially odorless and tasteless.

It will be evident from the above description that our invention provides a new and effective method of preparing substantially odorless and tasteless fatty substances from fatty substances objectionable in these respects. Our invention will, therefore, be of great interest to those engaged in the preparation of refined fatty substances, particularly to those engaged in the prepartion of vitamin compositions for human and animal consumption.

It is to be understood that the vitamin contents of the various oils mentioned in the specification are given in international vitamin units.

Since certain changes in carrying out the above process and certain modifications in the compositions which embody the invention may be made without departing from its scope, it is intended that all matter contained in the above description shall be interpreted as illustrative and not in a limiting sense.

Having described our invention, what we claim as new and desire to secure by Letters Patent is:

1. A process for the removal of undesirable tastes and odors from fatty substances objectionable in these respects, which comprises subjecting a fatty substance having an objectionable taste and odor, said substance being in liquid condition and substantially free of mineral acids, to the action of vapors of an aliphatic aldehyde having a boiling point below about 200° C., said process being carried out at a temperature between about 100° C. and about 175° C.

2. A process for the removal of undesirable tastes and odors from fatty substances objectionable in these respects, which comprises subjecting a fatty substance having an objectionable taste and odor, said substance being in liquid condition and substantially free of mineral acids, to the action of vapors of an aldehyde containing not more than 2 carbon atoms, said process being carried out at a temperature between about 100° C. and about 175° C.

3. A process for the preparation of substantially odorless and tasteless fat-soluble vitamin-containing materials from fat-soluble vitamin-containing materials having objectionable tastes and odors, which comprises subjecting a fat-soluble vitamin-containing material having an objectionable taste and odor, said material being in liquid condition and substantially free of mineral acids, to the action of vapors of an aliphatic aldehyde having a boiling point below about 200° C., said process being carried out at a temperature between about 100° C. and about 175° C.

4. A process for the preparation of substantially odorless and tasteless fat-soluble vitamin-containing materials from fat-soluble vitamin-containing materials having objectionable tastes and odors, which comprises subjecting a fat-soluble vitamin-containing material having an objectionable taste and odor, said material being in liquid condition and substantially free of mineral acids, to the action of vapors of an aliphatic aldehyde having a boiling point below about 200° C., said process being carried out at a temperature between about 100° C. and about 175° C. in an inert gas atmosphere.

5. A process for the preparation of substantially odorless and tasteless fat-soluble vitamin-containing materials from fat-soluble vitamin-containing materials having objectionable tastes and odors, which comprises subjecting a fat-soluble vitamin-containing material having an objectionable taste and odor, said material being in liquid condition and substantially free of mineral acids, to the action of vapors of an aliphatic aldehyde having a boiling point below about 200° C., said process being carried out at a temperature between about 100° C. and about 175° C. under reduced pressure.

6. A process for the preparation of substantially odorless and tasteless fat-soluble vitamin-containing materials from fat-soluble vitamin-containing materials having objectionable tastes and odors, which comprises subjecting a fat-soluble vitamin-containing material having an objectionable taste and odor, said material being in liquid condition and substantially free of mineral acids, to the action of vapors of an aliphatic aldehyde having a boiling point below about 200° C., said process being carried out at a temperature between about 100° C. and about 175° C. in an inert gas atmosphere and under reduced pressure.

7. A process for the preparation of substantially odorless and tasteless fat-soluble vitamin-containing materials from fat-soluble vitamin-containing materials having objectionable tastes and odors, which comprises subjecting a fat-soluble vitamin-containing material having an objectionable taste and odor, said material being in liquid condition and substantially free of mineral acids, to the action of formaldehyde vapors at a temperature between about 100° C. and about 175° C.

8. A process for the preparation of substantially odorless and tasteless fat-soluble vitamin-containing materials from fat-soluble vitamin-containing materials having objectionable tastes and odors, which comprises subjecting a fat-soluble vitamin-containing material having an objectionable taste and odor, said material being in liquid condition and substantially free of mineral acids, to the action of acetaldehyde vapors at a temperature between about 100° C. and about 175° C.

9. A process for refining fish liver oils, which comprises subjecting a fish liver oil to the action of vapors of an aliphatic aldehyde having a boiling point below about 200° C., said process being carried out at a temperature between about 100° C. and about 175° C.

10. A process for refining fish liver oils, which comprises subjecting a fish liver oil to the action of vapors of an aliphatic aldehyde having a boiling point below about 200° C., said process being carried out at a temperature between about 100° C. and about 175° C. in an inert gas atmosphere.

11. A process for refining fish liver oils, which comprises subjecting a fish liver oil to the action of vapors of an aliphatic aldehyde having a boiling point below about 200° C., said process being carried out at a temperature between about 100° C. and about 175° C. under reduced pressure.

12. A process for refining fish liver oils, which comprises subjecting a fish liver oil to the action of vapors of an aliphatic aldehyde having a boiling point below about 200° C., said process being carried out at a temperature between about 100° C. and about 175° C. in an inert gas atmosphere and under reduced pressure.

13. A process for refining fish liver oils, which comprises subjecting a fish liver oil to the action of formaldehyde vapors at a temperature between about 100° C. and about 175° C. in an inert gas atmosphere and under reduced pressure.

14. A process for refining fish liver oils, which comprises subjecting a fish liver oil t othe action of acetaldehyde vapors at a temperature between about 100° C. and about 175° C. in an inert gas atmosphere and under reduced pressure.

15. A process for refining fish liver oils, which comprises heating a fish liver oil to a temperature between about 100° C. and about 175° C. in an inert gas atmosphere and under reduced pressure, generating formaldehyde vapors in a vessel connected with the vessel containing the heated oil, and permitting the vapors to pass through the heated oil until the oil becomes substantially odorless and tasteless.

16. A process for refining fish liver oils, which comprises heating a fish liver oil to a temperature between about 100° C. and about 175° C. in an inert gas atmosphere and under reduced pressure, generating acetaldehyde vapors in a vessel connected with the vessel containing the heated oil, and permitting the vapors to pass through the heated oil until the oil becomes substantially odorless and tasteless.

17. A process for refining fish liver oils, which comprises mixing the oil with a completely de-aerated mixture of decolorizing carbon and a solvent for the oil, separating the carbon from the decolorized oil solution, evaporating the solvent, and subjecting the oil at a temperature of about 100° C. to about 175° C. to the action of the vapors of an aliphatic aldehyde having a boiling point below about 200° C.

LORAN O. BUXTON.
HOWARD B. COLMAN.